United States Patent
White et al.

(10) Patent No.: US 6,907,898 B2
(45) Date of Patent: Jun. 21, 2005

(54) FLUID SHUTOFF APPARATUS

(76) Inventors: Travis H. White, 479 Grove St. N., P.O. Box 365, Dahlonega, GA (US) 30533; Clark J. Anderson, 479 Grove St. N., P.O. Box 365, Dahlonega, GA (US) 30533; Robert N. Owens, 479 Grove St. N., P.O. Box 365, Dahlonega, GA (US) 30533

( * ) Notice: Subject to any disclaimer, the term of this patent is extended or adjusted under 35 U.S.C. 154(b) by 282 days.

(21) Appl. No.: 10/409,309

(22) Filed: Apr. 8, 2003

(65) Prior Publication Data

US 2004/0007266 A1 Jan. 15, 2004

Related U.S. Application Data

(60) Provisional application No. 60/394,546, filed on Jul. 10, 2002.

(51) Int. Cl.[7] .............................................. F16K 17/20
(52) U.S. Cl. ................... 137/460; 137/388; 137/599.11
(58) Field of Search ................................ 137/460, 498, 137/487.5, 388, 599.11

(56) References Cited

U.S. PATENT DOCUMENTS

| | | | |
|---|---|---|---|
| 1,988,656 A | 1/1935 | Henderson | |
| 3,800,827 A | * 4/1974 | Gonsior | 137/498 |
| 3,986,482 A | * 10/1976 | Novak | 119/14.08 |
| 4,202,368 A | * 5/1980 | Akkerman et al. | 137/498 |
| 4,880,030 A | 11/1989 | Terry | |
| 4,946,140 A | 8/1990 | Kajihara | |
| 4,964,421 A | * 10/1990 | Klaus | 137/460 |
| 5,613,513 A | 3/1997 | Makowan | |
| 5,704,389 A | * 1/1998 | Bouzaglou | 137/487.5 |
| 6,237,618 B1 | 5/2001 | Kushner | |

* cited by examiner

Primary Examiner—Stephen M. Hepperle
(74) Attorney, Agent, or Firm—Kenneth S. Watkins, Jr.

(57) ABSTRACT

A fluid shutoff apparatus utilizes a float [121] of a float chamber [115] connected to a float-operated valve [113] to provide positive shutoff of fluid to a downstream load upon excessive flow from the fluid outlet [109] of the apparatus. The float-operated valve is shut when fluid discharge from the apparatus is greater than the flow rate from a flow-limiting valve [103] connected to a fluid inlet [107], decreasing the fluid level in the float chamber. The volume of the float chamber prevents inadvertent shutoff of fluid due to normal perturbations in flow to the load.

18 Claims, 4 Drawing Sheets

FLUID SHUTOFF APPARATUS

This application claims the benefit of prior U.S. Provisional Application No. 60/394,546 filed Jul. 10, 2002.

FIELD OF THE INVENTION

The present invention relates to fluid flow apparatus and, more particularly, to fluid shutoff apparatus for securing flow to a load upon sensing excessive flow.

BACKGROUND OF THE INVENTION

A frequent problem exists when leaks or ruptures in piping result in flooding or other damage to residences, commercial and industrial structures, and businesses. For example, ruptures in water piping in buildings resulting from freezing pipes or faulty workmanship or materials can result in significant damage, especially if the building is not occupied and the problem is not discovered immediately. Many businesses such as poultry hatcheries and livestock farms require a constant water supply source that may result in significant damage by flooding if severe leaks occur.

A number of prior art devices have been disclosed to detect excessive flow due to significant leaks and shut off flow to prevent flooding. For example, U.S. Pat. No. 6,237,618 discloses a system and method for controlling the flow of water through a water supply line. The system includes a flow meter and a systems controller that closes a valve upon excessive flow for a predetermined period. The device provides flexibility of use, but is complicated and requires a source of electrical power.

U.S. Pat. No. 4,880,030 discloses a flow control fluid shutoff device which cuts off the water supply to a house or building upon overly high water consumption. The device has limited flexibility for normal perturbations in flow and requires a complicated, custom body design.

A need exists for a simple mechanical apparatus for detecting excessive flow to a load which allows for normal perturbations in flow and can be made primarily from readily available components.

OBJECTS AND SUMMARY OF THE INVENTION

Therefore, an object of the present invention is to provide a fluid shutoff apparatus which detects excessive flow and shuts off flow to the load.

Another object of the present invention is to provide a fluid shutoff apparatus which prevents inadvertent shutoff of flow due to normal perturbations in flow.

Another object of the present invention is to provide a fluid shutoff apparatus which remains in a shutoff condition, once tripped, until the apparatus is reset.

Another object of the present invention is to provide a fluid shutoff apparatus which can be assembled primarily from commercially-available components.

Still another object of the present invention is to provide a fluid shutoff apparatus which is simple and low in cost.

The fluid shutoff apparatus comprises a float chamber and float-operated valve downstream of a flow-limiting valve. An automatic air vent valve is located between the flow-limiting valve and the float chamber. The flow-limiting valve is selected to provide the maximum flow used by the system or load. Excessive flow, such as that resulting from a downstream pipe break, results in flow from the apparatus greater than that provided by the flow-limiting valve. As level in the float chamber decreases, the float-operated valve shuts and secures flow to the load. The apparatus maintains a shutoff condition until the break is repaired and the apparatus is restored to service.

The volume of the float chamber acts as a reservoir to provide short term increases in flow greater than the flow-limiting valve capacity without system shutdown. The size of the float chamber is selected to provide the desired amount of reserve capacity of the apparatus.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of an automatic fluid shutoff apparatus which positively shuts off fluid flow to a load upon excessive flow.

Figure 1:
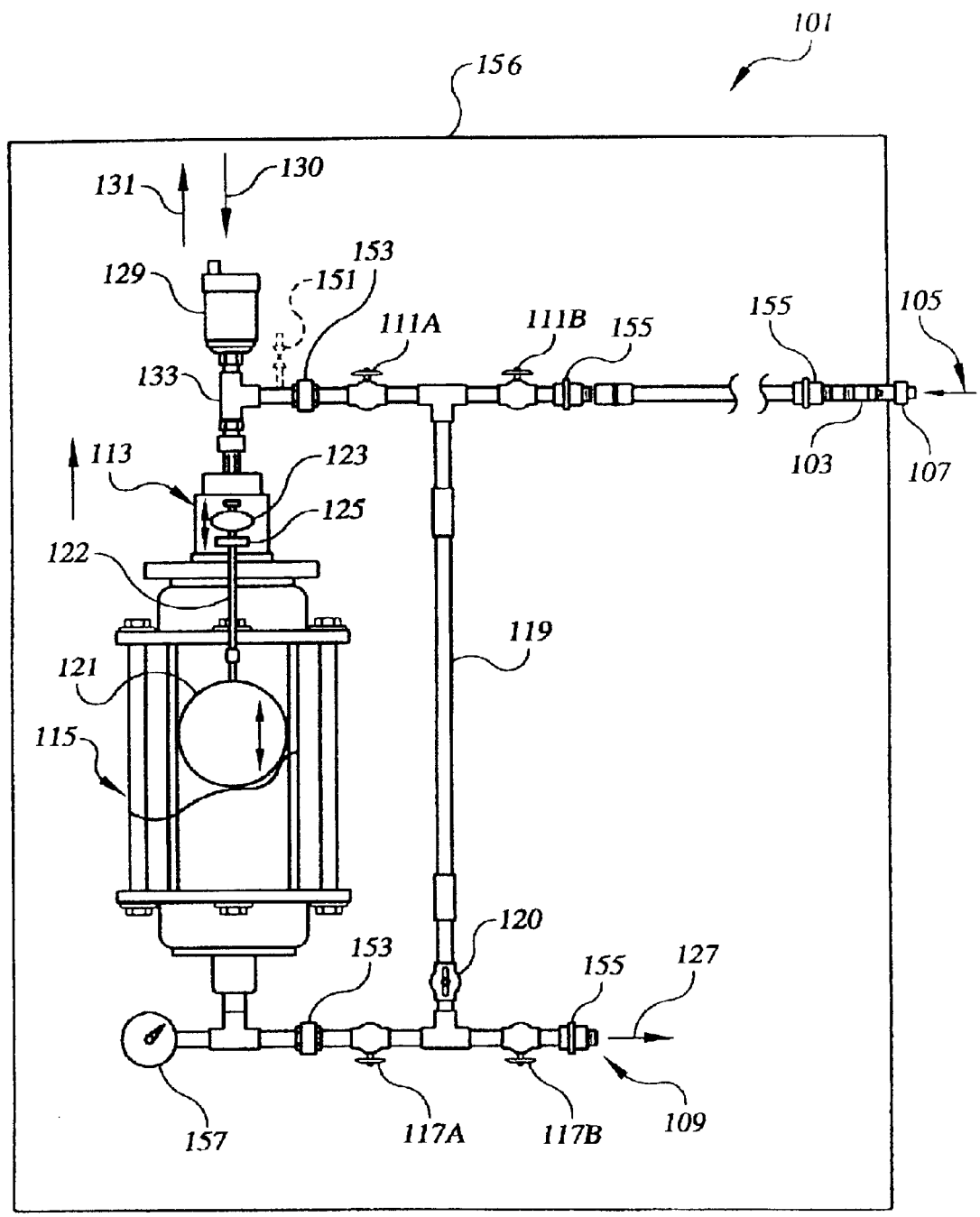
FIG. 1 is a schematic connection diagram showing the components of the fluid shutoff apparatus including a fluid inlet, flow-limiting valve, vent valve, float-operated valve, float chamber with float assembly, bypass line and fluid outlet.

FIG. 1 is a schematic diagram of the flow shutoff apparatus 101 designed for use with water supply systems in industrial, commercial and residential buildings and water-consuming products. The apparatus comprises a flow-limiting device such as a flow-limiting valve 103 connected to a water supply source 105 at fluid inlet 107. In the preferred embodiments, flow-limiting valve 103 limits water flow to a preselected flow rate over a range of supply pressures at the water supply source as indicated by arrow 105.

Water flow from flow-limiting valve 103 is supplied to fluid outlet 109 via stop valves 111A, 111B, float-operated valve 113, float chamber 115, and stop valves 117A, 117B. Stop valves 111A, 111B and 117A, 117B direct water flow to and from bypass line 119 as explained in more detail later.

Rod 122 connects float 121 to poppet 123 of float-operated valve 113. In normal operation, float chamber 115 is filled with water, and float 121 is biased upward by buoyancy in float chamber 115 to lift poppet 123 (shown schematically) of float-operated valve 113 from seat 125 (shown schematically) to allow normal water flow from fluid inlet 107 to fluid outlet 109. Flow to the load, as indicated by arrow 127 is maintained as long as the water consumption at fluid outlet 109 is equal or less than flow allowed by flow-limiting valve 103. In normal operation, stop valves 111A, 111B, 117A and 117B are open and bypass shutoff valve 120 is shut.

Upon excessive flow from the fluid outlet, such as that caused by a rupture or leak in downstream water pipes or the load being supplied, pressure downstream of flow-limiting valve 103 will drop, allowing air to enter float chamber 115 via automatic air vent 129 (shown by arrow 130). As fluid level in float chamber 115 drops, float 121 drops due to gravity until poppet 123, connected to float 121, seals against seat 125, shutting off float-operated valve 113. Flow is secured from fluid outlet 109 even if the leak is secured since full supply pressure seats float-operated valve 113 and no source of pressure is available to refill float chamber 115.

In order to initiate flow at startup, or upon repair of the problem causing excessive load flow, stop valves 111A and 117B are shut and bypass valve 120 is opened to allow flow from fluid inlet 107 to float chamber 115 via bypass line 119. Air is vented in direction 131 from automatic vent valve 129 to allow float chamber 115 to completely fill and to vent float-operated valve 113 and associated piping such as "T" 133. Once all air is vented from the system, automatic vent valve 129 shuts, bypass valve 120 is shut and stop valves 111A and 117B are opened to allow flow to the load.

Figure 2:
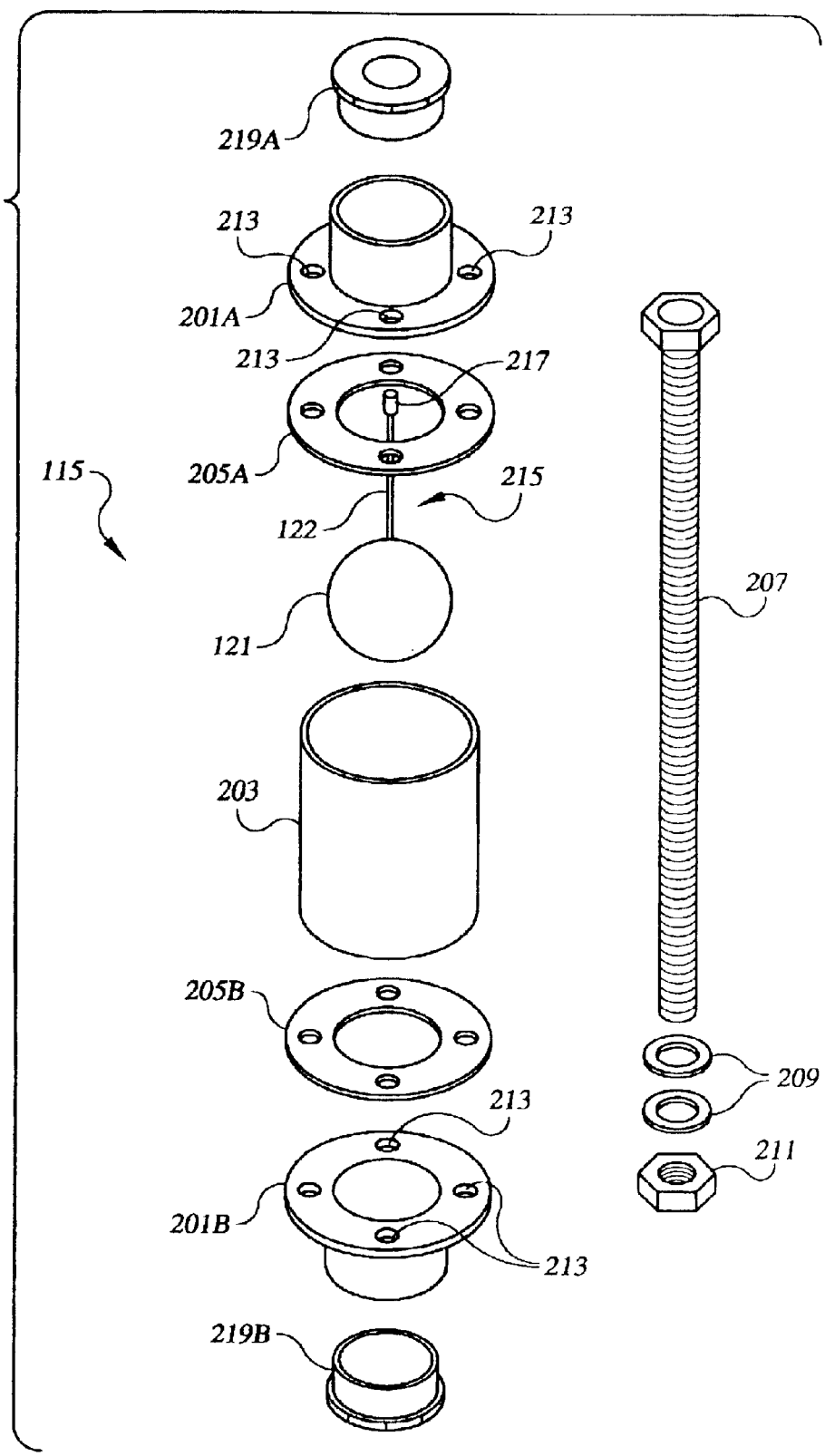
FIG. 2 is an exploded drawing showing the components of the float chamber with float assembly of FIG. 1.

FIG. 2 is an exploded drawing of float chamber 115 showing top flange 201A and bottom flange 201B for assembly and sealing to sleeve 203 by top gasket 205A and bottom gasket 205B. Four hex head bolts such as bolts 207, washers 209 and nut 211 secure flanges 201A, 201B to sleeve 203 when inserted through holes 213 of the flanges. Float assembly 215, comprising float 121, rod 122 and coupling 217 is inserted in sleeve 203 before assembly. Top bushing 219A and bottom bushing 219B provide mechanical and fluid connections to chamber 115.

The size of float chamber 115 is selected to provide a cushioning or filtering effect for short duration flow increases and other flow perturbations, such as those resulting from normal operation of the load supplied. Such a cushioning effect prevents inadvertent cutoff of flow due to these normal perturbations in flow. The larger the capacity of float chamber 115 as compared to the maximum flow rate of flow-limiting valve 103, the longer time duration before float-operated valve 113 is shut when an excessive downstream flow occurs. In the preferred embodiment, the volume of float chamber 115 is selected to be equivalent to at least one second flow at the flow rate of flow-limiting valve 103. In the more preferred embodiments, the volume is selected to be the equivalent of at least 3 seconds flow at the flow rate of flow-limiting valve 103. In the most preferred embodiments, the volume is selected to be the equivalent of at least 10 seconds flow at the flow rate of flow-limiting valve 103.

Figure 3:
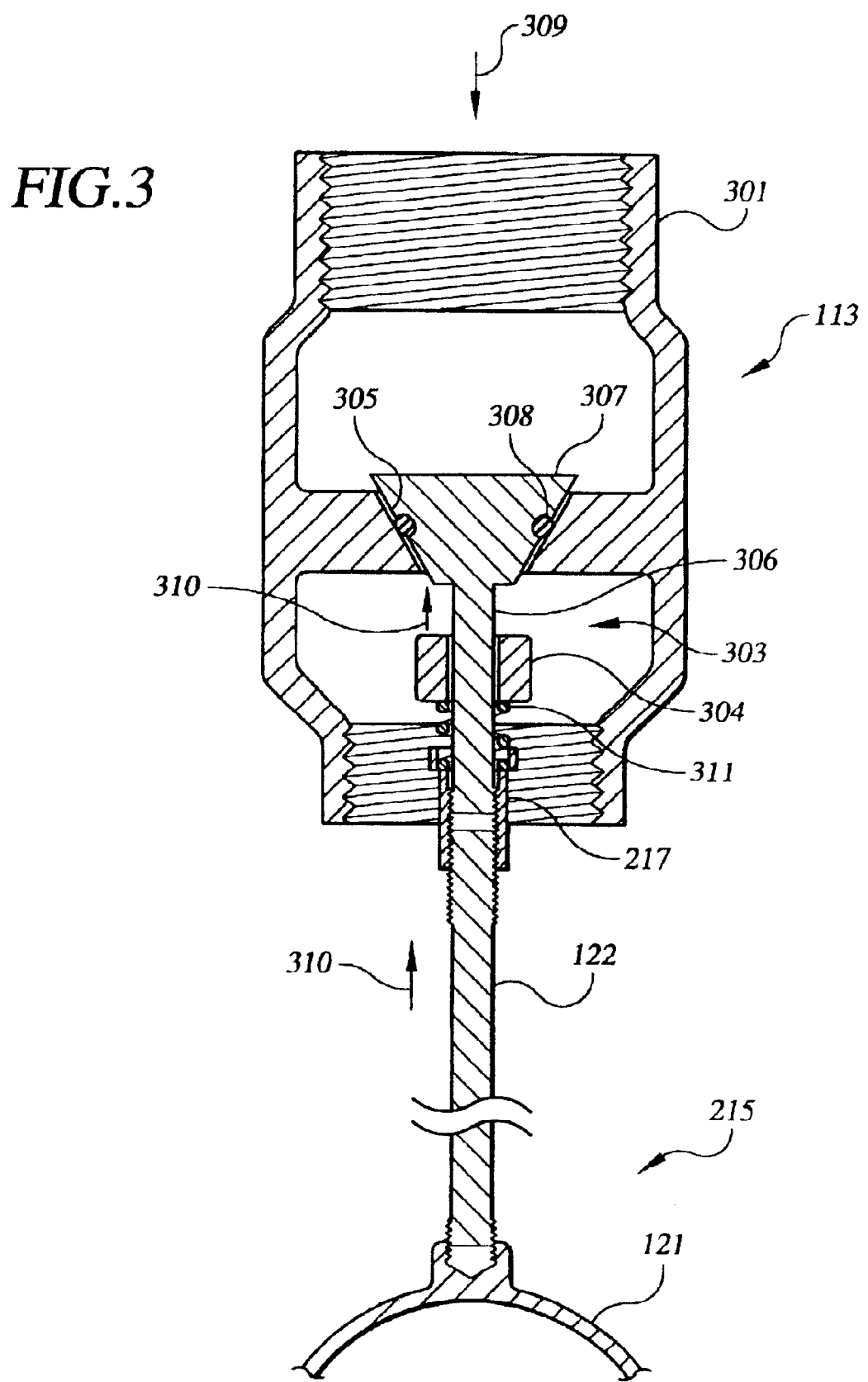
FIG. 3 is a cross sectional drawing of the float-operated valve and float assembly of FIG. 1.

FIG. 3 is a cross section drawing of float assembly 215 and float-operated valve 113 of the apparatus. Float-operated valve 113 comprises body 301, poppet assembly 303 and seat 305. Poppet 307 of poppet assembly 303 seats against seat 305 with upstream pressure of flow 309 and is also biased against seat 305 by helical spring 311. Resilient seal such as O-ring seal 308 provides tight shut-off of valve 113. Stem guide 304 provides transverse support for stem 306 and allows vertical motion of poppet 307. Stem guide 304 also provides transverse support for rod 122 and, together with sleeve 203-ball 121 clearance, constrains motion of the assemblies to vertical motion such as shown by arrow 310. Additional guides, such as a guide in upper bushing 219A of FIG. 2 (not shown) may also be used.

Rod 122 and coupling 217 connect float 121 of float assembly 215 to the bottom of poppet assembly 303. When float chamber 115 of FIG. 1 is full of fluid, the buoyant force of float 121 is sufficient to lift poppet 307 off its seat shown by direction arrow 310 against spring pressure and the seating pressure upstream of poppet 307.

Figure 4:
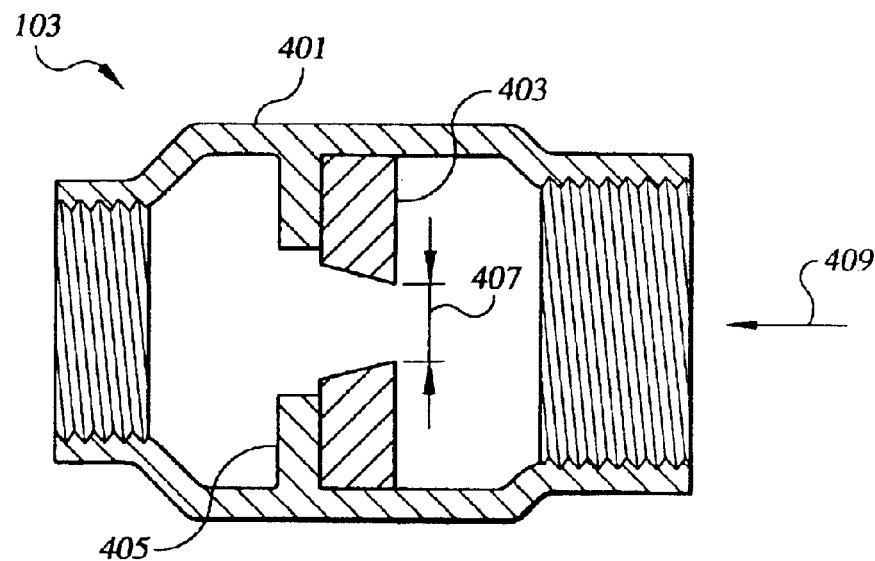
FIG. 4 is a cross sectional drawing of the flow-limiting valve of FIG. 1.

FIG. 4 is a cross section drawing of flow-limiting valve 103 of the apparatus and comprises a body 401, orifice 403 and retaining ring 405. Orifice 403 restricts flow 409 by creating a pressure drop across the orifice. In the preferred embodiments, orifice 403 is made of a resilient material such as an elastomer, known in the art, which deforms under pressure upstream of the orifice. Deformation of orifice 403 under high upstream pressure reduces orifice-opening 407 to maintain a relatively constant flow 409, even with a varying differential pressure across the valve.

Other types of flow-limiting devices such as fixed orifices, capillary tubes, restrictor baffles, and flow control valves can also be used. In still other embodiments, flow-limiting valve 103 is an adjustable flow control valve known in the art.

Figure 5:
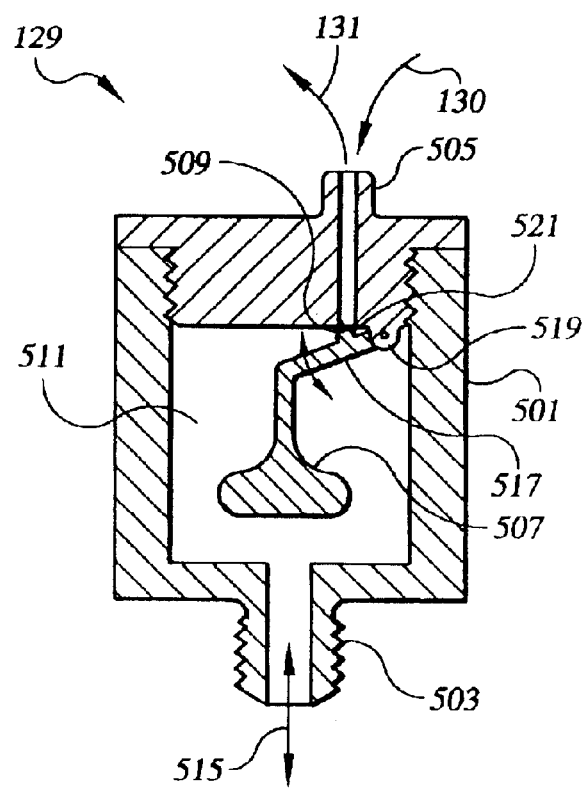
FIG. 5 is a cross sectional drawing of the automatic vent valve of FIG. 1.

FIG. 5 is a cross section drawing of air vent valve 129 of FIG. 1. In the preferred embodiment, vent valve 129 is an automatic float-type vent valve comprising a body 501, vent connector fitting 503, air inlet/outlet 505, float assembly 507, and seat 509. When no fluid is in cavity 511 of valve 129, float assembly 507 is in a downward position due to gravity as shown in the figure. The cavity-drained condition allows air entering connection fitting 503 (during priming of the system) to exhaust through air inlet/outlet 505 as shown by arrow 131. Upon completion of priming, fluid enters connection fitting 503 and fills cavity 511. Float assembly 507 raises against gravity due to the buoyancy of the float assembly 507. Arm 517 rotates upward about pivot 519, seating seat poppet 521 against seat 509 and preventing water flow out of air inlet/outlet 505.

The system remains sealed until a vacuum (created by flow at fluid outlet 109 exceeding flow downstream of flow-limiting valve 103) unseats poppet 521 against seat 509. Unseating of poppet 521 allows air to enter cavity 511 and float chamber 115 of FIG. 1 from air inlet/outlet 505 as shown by arrow 130. In an alternative embodiment, vent valve 129 is a check valve allowing air into the system upon a vacuum forming downstream of flow limiting valve 103, and a manual stop valve (151 of FIG. 1) is opened for priming of the system and then shut for normal operation.

For maximum flexibility, the apparatus is assembled from separate components described previously and connected by standard piping connections such as unions 153 and fittings 155. For example, flow-limiting valve 103 may be located remotely from the rest of the components. Indicators and gauges such as pressure gauge 157 of FIG. 1 may be used for system monitoring and troubleshooting. In other embodiments, some or all of the components may be mounted on a single board, frame or even an integral body to reduce the size of the apparatus, as shown by the mounting board 156 of FIG. 1.

Accordingly, the reader will see that the flow shutoff apparatus provides a simple, reliable method to positively secure fluid flow to a load upon excessive flow as would occur from a downstream break or severe leak. The device provides the following additional advantages:

The apparatus provides protection from inadvertent shutoff due to short perturbations of flow;

The amount of filtering for flow perturbations can be selected by adjusting the size of the float chamber;

The components are simple, reliable and easily obtainable; and

The device is low in cost.

Although the description above contains many specifications, these should not be construed as limiting the scope of the invention but merely providing illustrations of some of the presently preferred embodiments of this invention. For example, the float-operated valve may be downstream of the float chamber or the apparatus may be used with other fluid supply systems such as fuel systems. Thus the scope of the invention should be determined by the appended claims and their legal equivalents, rather than by the examples given.

We claim:

1. A fluid shutoff apparatus for shutting off flow upon excessive demand, the apparatus comprising:

a fluid inlet and a fluid outlet;

a flow-limiting element downstream of said fluid inlet;

a float chamber comprising a float in fluid communication with said fluid inlet and said fluid outlet and disposed in-line between said flow-limiting element and said fluid outlet;

a float-operated shutoff valve disposed between said flow-limiting element and said fluid outlet, said float operably connected to said float-operated valve wherein said float-operated valve is open when said float chamber is full of fluid and said float-operated valve is shut when said float chamber is empty of fluid; and a vent valve in fluid communication with said float chamber;

whereby said float chamber is drained of fluid when fluid flow from said fluid discharge exceeds fluid flow from said flow-limiting element, shutting said float-operated valve.

2. The fluid shutoff apparatus of claim 1 wherein said flow-limiting element is an orifice.

3. The fluid shutoff apparatus of claim 1 wherein said flow-limiting element is a flow-limiting valve.

4. The fluid shutoff apparatus of claim 1 comprising a bypass line between said fluid inlet and said fluid outlet.

5. The fluid shutoff apparatus of claim 1 wherein said float-operated valve is disposed between said flow-limiting element and said float chamber.

6. The fluid shutoff apparatus of claim 5 wherein said float of said float chamber is connected to a poppet of said float-operated valve.

7. The fluid shutoff apparatus of claim 6 wherein said poppet is biased in a poppet-seated direction and a connector between said float and said poppet opens said poppet against bias pressure when said float chamber if full of fluid.

8. The fluid shutoff apparatus of claim 1 wherein a volume of said float chamber is selected to provide a preselected overcapacity of fluid flow from said fluid outlet as compared to said fluid inlet.

9. The fluid shutoff apparatus of claim 8 wherein said preselected overcapacity is at least one second of a maximum flow rate from said flow-limiting element.

10. The fluid shutoff apparatus of claim 8 wherein said preselected overcapacity is at least three seconds of a maximum flow rate from said flow-limiting element.

11. The fluid shutoff apparatus of claim 8 wherein said preselected overcapacity is at least ten seconds of a maximum flow rate from said flow-limiting element.

12. The fluid shutoff apparatus of claim 1 wherein said vent valve comprises a second float-operated valve whereby water is prevented from venting from said vent valve.

13. The fluid shutoff apparatus of claim 4 comprising a first bypass shutoff valve disposed between an inlet end of said bypass line and said float chamber and a second bypass shutoff valve disposed between an outlet end of said bypass line and said fluid outlet, whereby shutting said first bypass shutoff valve and said second bypass shutoff valve provides fluid to an outlet end of said float chamber for initial filling.

14. A fluid shutoff apparatus for shutting off flow upon excessive demand, the apparatus comprising:

a fluid inlet and a fluid outlet;

a flow-limiting element downstream of said fluid inlet;

a float-operated shutoff valve downstream of said flow-limiting element:

a sealed float chamber comprising a float, a chamber inlet downstream of said float-operated shutoff valve and a chamber outlet in fluid communication with said fluid outlet, said float of said float chamber operably connected to said float-operated valve wherein said float-operated valve is open when said float chamber is full of fluid and said float-operated valve is shut when said float chamber is empty of fluid; and a vent valve disposed between said flow-limiting element and said chamber outlet of said float chamber;

whereby said float chamber is drained of fluid when fluid flow from said fluid discharge exceeds fluid flow from said flow-limiting element, shutting said float-operated valve.

15. The fluid shutoff apparatus of claim 14 wherein said flow-limiting element comprises an orifice.

16. The fluid shutoff apparatus of claim 14 wherein said flow-limiting element comprises an orifice made of an elastomeric material.

17. The fluid shutoff apparatus of claim 14 wherein said vent valve comprises a second float-operated valve whereby water is prevented from venting from said vent valve.

18. The fluid shutoff apparatus of claim 11 comprising a bypass line between said fluid inlet and said fluid outlet.

* * * * *